US012650440B2

(12) United States Patent
Rix et al.

(10) Patent No.: US 12,650,440 B2
(45) Date of Patent: Jun. 9, 2026

(54) STERILE PROTECTION ATTACHMENT FOR TIPS OF LIQUID-HANDLING DEVICES

(71) Applicant: EPPENDORF SE, Hamburg (DE)

(72) Inventors: Karl Rix, Velbert (DE); Sebastian Selzer, Klosterneuburg (AT); Falk Schneider, Aachen (DE); Kai Schüler, Hoffeld (CH); Christophe Schillig, Gossau (CH)

(73) Assignee: EPPENDORF SE, Hamburg (DE)

( * ) Notice: Subject to any disclaimer, the term of this patent is extended or adjusted under 35 U.S.C. 154(b) by 544 days.

(21) Appl. No.: 18/271,592

(22) PCT Filed: Jan. 11, 2022

(86) PCT No.: PCT/EP2022/050367

§ 371 (c)(1),
(2) Date: Jul. 10, 2023

(87) PCT Pub. No.: WO2022/148874

PCT Pub. Date: Jul. 14, 2022

(65) Prior Publication Data

US 2024/0053373 A1 Feb. 15, 2024

(30) Foreign Application Priority Data

Jan. 11, 2021 (EP) ..................................... 21150942

(51) Int. Cl.
*G01N 35/10* (2006.01)
(52) U.S. Cl.
CPC ................................ *G01N 35/1004* (2013.01)

(58) Field of Classification Search
CPC ...... C12M 23/38; C12M 23/40; C12M 33/04; C12M 37/02; C12M 37/04; G01N 35/1004
See application file for complete search history.

(56) References Cited

U.S. PATENT DOCUMENTS

| | | | |
|---|---|---|---|
| 5,368,801 | A | 11/1994 | Vaillancourt |
| 5,885,255 | A | 3/1999 | Jaeger, Jr. et al. |
| 6,085,602 | A | 7/2000 | Schorn et al. |
| 6,202,713 | B1 | 3/2001 | Drescher et al. |
| 7,947,032 | B2 | 5/2011 | Harding et al. |
| 8,431,089 | B2 | 4/2013 | Steigmiller et al. |
| 8,522,996 | B2 | 9/2013 | Beese et al. |
| 2004/0029170 | A1 | 2/2004 | Wolfram et al. |

FOREIGN PATENT DOCUMENTS

| | | | |
|---|---|---|---|
| CA | 3168962 | C * | 11/2025 |
| DE | 3439778 | | 4/1986 |
| DE | 4432599 | | 3/1996 |
| DE | 20316936 | | 3/2004 |

(Continued)

*Primary Examiner* — Jennifer Wecker
(74) *Attorney, Agent, or Firm* — Dinsmore & Shohl LLP

(57) ABSTRACT

A sterile protection attachment for a tip of a liquid-handling device including a mount for fastening the sterile protection attachment to the liquid-handling device, a protective bell arranged in the mount and having an inner cavity, and a supply line for sterile air connected to the inner cavity, in which the protective bell has an opening at a lower end and has a receiver for the tip at an upper side opposite the lower end and within which the tip can be flushing with sterile air.

19 Claims, 3 Drawing Sheets

(56)　　　　　　　References Cited

FOREIGN PATENT DOCUMENTS

| | | |
|---|---|---|
| DE | 102006019242 | 10/2007 |
| DE | 102006062982 | 10/2014 |
| EP | 0283584 | 9/1988 |
| EP | 3514223 | 7/2019 |
| WO | 9902961 | 1/1999 |
| WO | 2013053778 | 4/2013 |
| WO | 2013053779 | 4/2013 |
| WO | 2013150064 | 10/2013 |
| WO | 2013158756 | 10/2013 |
| WO | 2013186294 | 12/2013 |
| WO | 2016066768 | 5/2016 |
| WO | 2017129800 | 8/2017 |
| WO | 2021008788 | 1/2021 |
| WO | 2021008814 | 1/2021 |
| WO | 20221122333 | 6/2021 |
| WO | 2022122334 | 6/2022 |

* cited by examiner

STERILE PROTECTION ATTACHMENT FOR TIPS OF LIQUID-HANDLING DEVICES

CROSS-REFERENCE TO FOREIGN PRIORITY APPLICATION

The present application claims the benefit under 35 U.S.C. § 119(b), 119(e), 120, 121, 365(c), and/or 386(c) of PCT/EP2022/050367 filed Jan. 11, 2022, which claims priority to European Patent Application No. 21150942.7 filed Jan. 11, 2021.

FIELD OF THE INVENTION

The invention relates to a sterile protection attachment for a tip of a liquid-handling device, to a sterile protection unit, to a liquid-handling system, to a method for operating a sterile protection attachment and to a method for filling or withdrawal using a sterile protection unit and using a liquid-handling system.

BACKGROUND OF THE INVENTION

Autosamplers or pipetting robots, which automate the process of sample preparation and distribution to a downstream and usually sequential analysis, can be typically found on the market. The samples are usually already available in suitable miniature vessels. Bioprocesses commonly require that samples be repeatedly withdrawn as sterilely as possible from the bioreactor during the cultivation therein and be stored temporarily or transferred directly (online) to an analysis. Since parallel operation of multiple bioreactors is increasingly being carried out, the sampling from multiple reactors is to be done via a sampling system (often in the form of a multiplexer). This requires compliance with usually increased sterile requirements, especially in the case of withdrawal from the bioreactor. The possibility of contamination from the environment or between different bioreactors (cross-contamination) must be reliably prevented. Online sampling systems can be in the form of hose-guided closed systems comprising pumps and valves or in the form of liquid-handling systems comprising reusable glass syringes or disposable plastic tips. In closed systems, the contamination or cleaning of the hoses, or the dead volume, is often a problem. Liquid-handling systems can, moreover, also be used for adding substances to multiple bioreactors during cultivation in a specific manner (e.g., on the basis of an evaluated analytical result for a previously withdrawn sample). In this case too, more reliable prevention of contamination is absolutely necessary.

Known liquid-handling systems often have to be operated in a sterile housing together with the bioreactor in order to reliably prevent contamination. This is usually undesirable because of the complexity, the spatial dimensions, and the limitations in handling by the laboratory staff.

It is therefore an object of the invention to make sterile work possible, in particular with liquid-handling systems, irrespective of the environment and to address the problems mentioned.

SUMMARY OF THE INVENTION

According to a first aspect, the invention relates to a sterile protection attachment for a tip of a liquid-handling device, comprising a mount for fastening the sterile protection attachment to the liquid-handling device, a protective bell arranged in the mount and having an inner cavity, and a supply line for sterile air connected to the cavity. The protective bell has an opening at a lower end and a receiver for the tip at an upper side opposite the lower end.

The invention is based on the finding that sterile work with a tip is possible even in nonsterile environments if the tip is continuously protected by a sterile protection attachment. This is achieved by arranging on the tip a protective bell, within which the tip can be continuously flushed with sterile air. A sterile air curtain is thus established within the protective bell. The tip is therefore encapsulated with respect to the environment and can be moved and used even in a nonsterile environment without contaminating a vessel upon entering said vessel.

The invention thus allows automated sterile work with tips in nonsterile environments in the filling of, for example, bioreactors with materials or the withdrawal of materials therefrom.

Tips are understood to mean not only sharp hollow needles, but also blunter tips such as pipette tips or male connecting pieces. In the context of this invention, penetration means not only piercing but also the pushing-open of self-closing diaphragms, for example in swabable valves, also referred to as wipeable valves or needle-free diaphragm valves, by blunt tips, for example male connecting pieces. A liquid-handling device is understood to mean all types of liquid-handling devices, especially also individual pipettes, individual syringes, individual lines with tips, handling robots, but also (automated) multi-systems.

In one embodiment of the sterile protection attachment, the receiver is an opening through which the tip can be guided. Flushing of the inner cavity with sterile air prevents nonsterile ambient air from entering the inner cavity, and the tip thus remains protected. It is particularly advantageous here if a constant stream of air is introduced into the cavity via the supply line, which stream of air generates a slight positive pressure in the cavity in comparison with the environment; for example, it is advantageous if the pressure inside the cavity is between 1 and 1.5 bar at an ambient pressure of 1 bar. Therefore, the slight positive pressure in particular means that the inflow of nonsterile air from the outside is reliably prevented and the tip is continuously enveloped at the same time.

Alternatively, the receiver is configured to gas- and liquid-tightly enclose the tip, thus preventing the ambient air from entering the inner cavity at the location of the receiver.

In one development, the receiver is configured as a self-closing diaphragm. In one embodiment, the self-closing diaphragm is configured as a pierceable septum, that is to say as a septum which, even when penetrated, is impermeable outside of the penetration and forms a tight seal with the penetrating object, that is to say the tip. It is particularly preferred if the pierceable septum is impermeable to gases and liquids, even if the septum is penetrated by the tip, in particular a hollow needle or a pipette tip, in particular by a hollow needle or pipette tip with a diameter of less than 1.5 mm, and even after multiple penetrations by such a hollow needle or pipette tip. In one embodiment, the pierceable septum has a slot, in particular a cross-shaped slot, for penetration. The septum may, for example, be made of silicone, natural rubber, polytetrafluoroethylene (PTFE), thermoplastic elastomer (TPE), or other elastomers; septa of this type are already known from the prior art. Alternatively, the receiver can have a seal, by means of which the interior of the protective bell is gas- and liquid-tightly closed off from the exterior at the location of the receiver. Both embodiments ensure that contaminated air cannot enter under the protective bell at the location of the receiver. This is further assisted by the flushing with sterile air, which prevents ambient air from entering under the protective bell.

In a further embodiment, the receiver is elastic in such a way that, in the case of a short travel path of the tip, in particular in the case of travel paths of less than 2 cm, part of the receiver is moved with the tip. This embodiment ensures, in the case of short travel paths when penetrating a vessel or bioreactor or the respective connection, that no part of the tip comes into contact with the ambient air when pulled out of the vessel or bioreactor or the respective connection and later returns to the interior of the protective bell. This further improves the sterile effect of the sterile protection attachment without having to provide a cleaning step between penetrations of the tip into vessels or connections.

Furthermore, the receiver in one embodiment has a thickness greater than the maximum travel path of the tip during operation. This also ensures that parts of the tip that have left the protective bell during travel do not return to the interior, but only to the receiver.

In a further embodiment, the lower end of the protective bell is configured in such a way that the protective bell forms a tight seal, in particular a gas-tight seal, with a vessel or connection when mounted thereon. In addition to the flushing of the interior of the protective bell with sterile air to encapsulate the tip with respect to the ambient air, what this embodiment ensures with the mounting via the tight seal is that no ambient air reaches the tip. Tight mounting of the protective bell is only advantageous if it is ensured that the vessel or connection itself is free of possible contamination. Alternatively, it is advantageous if, when the tip enters a vessel or connection, the protective bell maintains a specified distance from the vessel, meaning that no contact occurs between the protective bell and the vessel.

It is advantageous if the lower end of the protective bell is elastic. This can achieve, firstly, a better seal in the case of mounting onto a vessel or connection and, secondly, depending on the specific shape, further protection of the tip in the unmounted state, for example by simple inward movement of the lower end.

The opening of the protective bell has, for example, a cross-shaped slot, which advantageously also extends over a specific length of the tip. Now, if the tip is pushed in the direction of a vessel or connection and the protective bell is thus pushed onto the vessel or connection, the opening of the protective bell is also pushed open. This then allows the tip freely penetrate the vessel seals, locks up together with the sterile air in the inner cavity the tip with respect to the ambient air. Once the tip is retracted, the cross-shaped slot is substantially reclosed. Alternatively, a circular opening, for example, is also possible.

The protective bell is advantageously entirely or partly made of polyetheretherketone (PEEK). PEEK is sufficiently mechanically stable and elastic and additionally easily autoclavable, even multiple times.

Alternatively, the lower end of the protective bell can have a form-fit with a specific type of vessel or connection, in particular a specific type of bioreactor, in order to ensure a tight seal. A circular opening, for example, is possible here, too.

It is also advantageous if the mount is designed to be adjustable in length, in particular telescopic. As a result, the sterile protection attachment can be flexibly adapted to and used with various liquid-handling devices of different dimensions. In particular, this also allows retrofitting of existing liquid-handling devices.

In one embodiment, the supply line for sterile air comprises a sterile filter, in particular a sterile filter with a pore diameter of less than or equal to 0.22 μm, in particular a tip attachment filter. Alternatively, the supply line is connectable to a reservoir for sterile air. The supply line is also advantageously configured in such a way that enveloping with sterile air can be carried out continuously or at least during entry of the tip as far as complete penetration into a vessel or connection and as long as the tip does not penetrate a vessel or connection.

According to a second aspect, the invention relates to a sterile protection unit comprising a sterile protection attachment according to the first aspect of the invention and a tip of a liquid-handling device arranged in the receiver of the protective bell.

In a preferred embodiment of the sterile protection unit, the mount is configured and arranged in such a way that a lower open end of the tip is continuously arranged within the cavity of the protective bell during operation and is arranged below the cavity of the protective bell only when the tip penetrates into a vessel or connection. This additionally assures the sterility of the tip. Such a connection of a vessel is advantageously a multi-connector port comprising an air connection for sterile air and at least one connecting piece, at least one access arranged on the connecting piece, and at least one line arranged on the connecting piece, wherein the access comprises a self-closing diaphragm. It can particularly easily realize sterile work in a nonsterile environment.

In a further embodiment, the tip is movably arranged relative to the protective bell during operation. Thus, the tip can be moved in order to penetrate a connection or vessel without the lower end of the protective bell necessarily being elastic.

It is advantageous if the sterile protection unit comprises a stop which prevents the end of the tip from moving upward out of the interior of the protective bell. This prevents the end of the tip from coming into contact with the ambient air and thus prevents contamination due to possible operating errors. For example, the stop can be a mechanical stop or the stop is configured to send an electronic stop signal to a controller of the liquid-handling device when touched. Furthermore, other safeguards, especially in the case of automated liquid-handling devices, are possible, such as the setting of maximum travel paths or the like.

Alternatively, the tip is immovably arranged in relation to the mount and the lower end of the protective bell is elastic. This too allows penetration while maintaining sterility at the same time.

The sterile protection unit is preferably designed to be sterilizable, wherein the sterilization can preferably be performed by autoclaving, irradiation, or with ethylene oxide. Sterile access via the sterile protection unit can thus be realized by way of simple sterilization methods without the need to work in closed systems or workstations.

According to a third aspect, the invention relates to a liquid-handling system comprising at least one liquid-handling device having at least one sterile protection unit according to the second aspect of the invention.

Advantageously, the liquid-handling system further comprises at least one multi-connector port, wherein the multi-connector port comprises an air connection for sterile air, and also at least one access arranged on a connecting piece and comprising a self-closing diaphragm, and at least one line arranged on the connecting piece.

Especially this aspect of the invention is based on the further finding that automated additions and withdrawals are possible in particular in bioreactors and vessels without the need to work in sterile workstations or closed-off systems, and without the need for a wide variety of embodiments of bioreactors and vessels, if the addition or withdrawal point is decoupled from the reactor or vessel. This is achieved by using between the bioreactor and the liquid-handling device a multi-connector port which can be sterilely and tightly connected to the bioreactor via at least one line and which provides accesses for the liquid-handling device that are penetrable by tips while providing a seal to the outside. Together with the sterile protection attachment according to the first aspect of the invention, what is thus obtained is a particularly flexible system which allows sterile applications and/or withdrawals with a large number of different bioreactors and vessels even in nonsterile environments.

With the aid of the multi-connector port, dead volumes or contamination from previous addition or withdrawal processes can also be prevented or minimized if the multi-connector port can be purged via a connection for sterile air, such that liquid remaining in the connecting piece of the multi-connector port or in the line can be conveyed into the reactor or the vessel. It is thus also possible to work with very small sample or addition volumes, because these can be fully utilized. The multi-connector port according to the invention and its use thus provide a solution that can be used flexibly, does not require a sterile environment, and avoids dead volumes.

A large number of work steps are also made easier with a liquid-handling system having a multi-connector port. With the multi-connector port, it is thus possible, for example, to perform sample collection from a bioreactor, sample dispensing into microreaction vessels for subsequent analyses, sample dispensing into a collecting container, sample dispensing into an automated system such as an analysis device, bleeding of a bioreactor (removal of cells from the bioreactor in order to control the cell concentration), and addition of a medium or of a media cocktail, for example into a bioreactor. Furthermore, it is possible to supply media or media cocktails to the bioprocess in an automated and time-controlled manner.

The air connection may either be designed such that sterile air can be drawn through it into the tip and is then released from the tip into the at least one access, the air connection is then separate and not fluidically connected to the at least one access, or the air connection is directly fluidically connected to the at least one connecting piece and thus to the at least one access.

In one embodiment, a side of the sterile filter facing away from the self-closing diaphragm is thus in contact with the ambient air. If, in this embodiment, a tip is inserted through the self-closing diaphragm and outside air is drawn in by means of said tip via the sterile filter, the sterile air that is subsequently present in a reservoir belonging to the tip is thus available for application into the at least one access, and it is thus possible in a relatively simple manner for sterile air to be provided for a purging operation without the need for sterile air to be kept available. Alternatively, it is also possible for an air connection of a common air connection system, in which sterile air is present, to be provided, and for said sterile air to be drawn into the reservoir via the tip.

In alternative embodiments, the air connection is fluidically connected to the connecting piece, such that the at least one access, the air connection, and the at least one line are fluidically connected to one another via the at least one connecting piece. In this way, the access, connecting piece, and line can be purged using air that is released into the air connection. Here, too, the air connection may both be configured as a connection of an air connection system and comprise a further self-closing diaphragm and a sterile filter, in particular a sterile filter with a pore diameter of less than or equal to 0.22 μm. In the latter case, air is, for example, applied through the diaphragm via a further tip and applied, having been filtered by the sterile filter, into the connecting piece.

In one embodiment, the multi-connector port comprises multiple accesses arranged on the connecting piece. The provision of multiple accesses allows, for example, the simultaneous addition of different media but also the simultaneous withdrawal of multiple samples.

In a further embodiment, the multi-connector port has exactly one access and exactly one line on each connecting piece. In this embodiment, the media added or withdrawn via the accesses are conducted entirely separately from the respective access to the connected vessel, for example the bioreactor. It is thus possible, for example, for occurrences of mixing before entry into the bioreactor to be avoided. It is particularly preferred if the multi-connector port has exactly two connecting pieces on which in each case one access and one line are arranged. It is furthermore preferred if one access for an addition of media and one access for a withdrawal of media are formed. In this embodiment, samples can be withdrawn without the risk of adulteration by previously added media.

In one embodiment, the multi-connector port has a multiplicity of accesses and connecting pieces. In this embodiment, too, only one air connection is required, and this can be used for purging all accesses. It is particularly advantageous here if the air connection is configured such that sterile air can be drawn through it into a tip. This embodiment is particularly advantageous because it can be used simultaneously with a large number of bioreactors.

In further embodiments, the respective access and the respective line and also the air connection are fluidically connected via the respective connecting piece. Purging is thus possible in both accesses via one air connection, but the media are conducted between vessel and access separately from one another, such that occurrences of mixing or contamination are avoided.

In one embodiment, the at least one line of the multi-connector port has a gas- and liquid-tight connection at its end facing away from the connecting piece. Via this connection, the multi-connector port can be easily and securely connected to the head plate of a bioreactor, for example. Standardized connections that are compatible with the greatest possible number of containers or head plates are particularly advantageous here. For example, it may involve a Luer lock connection or screw connections. In a very simple embodiment, the at least one line is configured as a simple hose which can for example be plugged into a connection of a head plate of a bioreactor.

In one embodiment, the self-closing diaphragm of the multi-connector port is also configured as a pierceable septum. It is particularly preferred if the pierceable septum is impermeable to gases and liquids up to a pressure of 0.5 bar, even if the septum is penetrated by a hollow needle or a pipette tip, in particular by a hollow needle or pipette tip with a diameter of less than 1.5 mm, and even after multiple penetrations by such a hollow needle or pipette tip. In one embodiment, the pierceable septum has a slot, in particular a cross-shaped slot, for penetration. The septum may for example be made of silicone, natural rubber, PTFE, TPE, or other elastomers; septa of this type are already known from the prior art. In an alternative embodiment, the access may however also be configured as a needle-free diaphragm valve comprising the self-closing diaphragm; such valves are known for example from U.S. Pat. Nos. 5,368,801 A, 7,947,032 B2 or WO 2013/158756.

According to a fourth aspect, the invention relates to a method for operating a sterile protection attachment according to the first aspect of the invention, comprising the steps of:

introducing one end of a tip of a liquid-handling device into the inner cavity of the protective bell of the sterile protection attachment, wherein the tip is guided through the receiver of the protective bell;
    enveloping the end of the tip with sterile air from the supply line for sterile air.

In one embodiment of the method, introducing the end of the tip comprises penetrating the receiver of the protective bell. This is particularly advantageous if the receiver comprises a self-closing diaphragm or a seal.

Advantageously, the tip is cleaned before introducing the end into the inner cavity, in particular by wiping or rinsing with a cleaning agent comprising, for example, 70% isopropanol.

In one embodiment of the method, the entire sterile protection attachment or just the protective bell is sterilized before introducing the tip. This can be done either immediately before use or by using a sterile-packed exchangeable protective bell or sterile-packed exchangeable sterile protection attachment.

According to a fifth aspect, the invention relates to a method for filling or withdrawal using a sterile protection unit according to the second aspect of the invention, comprising the steps of:

introducing one end of the tip of the liquid-handling device into the inner cavity of the protective bell of the sterile protection attachment, wherein the tip is arranged in the receiver of the protective bell;
    enveloping the end of the tip with sterile air from the supply line for sterile air;
    cleaning an outer surface of a connection or vessel, in particular by wiping or rinsing with a cleaning agent comprising in particular isopropanol or ethanol;
    penetrating the connection or vessel with the tip;
    adding a medium into the connection or vessel or drawing a medium out of the connection or the vessel via the tip;
    withdrawing the tip from the connection or vessel.

In one embodiment, the method further comprises the step of:

stopping the enveloping when penetrating the connection or vessel by means of the tip, and optionally;
    resuming the enveloping once the tip is withdrawn from the vessel or connection.

Stopping the enveloping may be particularly advantageous in order to avoid cleaning agent still present on the outer surface of the connection or vessel being distributed in the space due to the air flow.

In one embodiment of the method, this protective bell is moved to a specified distance from the connection or vessel when penetrating the connection or vessel with the tip, thus avoiding mounting of the protective bell and thus possible contamination of the protective bell. In alternative embodiments, the protective bell is mounted, in particular gas-tightly mounted.

In a further embodiment, after the end of penetration of the vessel or connection, the tip is retracted in relation to the protective bell only to such an extent that the end of the tip remains within the cavity of the protective bell.

In one embodiment of the method, introducing the end of the tip comprises penetrating the receiver of the protective bell. This is particularly advantageous if the receiver comprises a self-closing diaphragm or a seal.

Advantageously, the tip is cleaned before introducing the end into the inner cavity, in particular by wiping or rinsing with a cleaning agent comprising, for example, 70% isopropanol.

In one embodiment of the method, the entire sterile protection attachment or just the protective bell is sterilized before introducing the tip. This can be done either immediately before use or by using a sterile-packed exchangeable protective bell or sterile-packed exchangeable sterile protection attachment.

According to a sixth aspect, the invention relates to a method for filling or withdrawal using a liquid-handling system according to the third aspect of the invention having at least one multi-connector port, wherein the multi-connector port comprises an air connection for sterile air, and also at least one access arranged on a connecting piece and comprising a self-closing diaphragm, and at least one line arranged on the connecting piece, comprising the steps of:

introducing one end of the tip of the liquid-handling device into the inner cavity of the protective bell of the sterile protection attachment;
    enveloping the end of the tip with sterile air from the supply line for sterile air;
    connecting the at least one line of the multi-connector port to a vessel, in particular a bioreactor or an addition bottle;
    cleaning an outer surface of the at least one access and/or an outer surface of the air connection, in particular by wiping or rinsing with a cleaning agent comprising in particular isopropanol or ethanol;
    penetrating the self-closing diaphragm of the at least one access with a tip, in particular in the form of a hollow needle, a pipette tip or a male connecting piece;
    adding a medium into the vessel or drawing a medium out of the vessel via the tip;
    withdrawing the tip.

The method according to the sixth aspect preferably further comprises the step of applying sterile air into the access. Applying sterile air into the access preferably comprises the following steps:

penetrating the further self-closing diaphragm of the air connection with a tip;
    drawing in ambient air through the sterile filter via the tip into a reservoir that is connected to the tip;
    withdrawing the tip from the further self-closing diaphragm;
    penetrating the self-closing diaphragm of the at least one access of the multi-connector port with the tip;
    applying air from the reservoir into the access.

This method, in conjunction with the further components of the liquid-handling system, makes it easy to use sterile air for purging and thus to avoid dead volumes without the need for sterile air to be kept available. This means that work can be carried out even more flexibly and more independently of other infrastructure.

Alternatively, the application of sterile air via the air connection is performed by virtue of sterile air being applied via the air connection into the at least one connecting piece that is fluidically connected to the air connection, wherein either sterile air is supplied from the outside via the air connection or air is applied via a further self-closing diaphragm and a sterile filter into the at least one connecting piece and the at least one line arranged thereon and the at least one access.

In one embodiment of the method, introducing the end of the tip comprises penetrating the receiver of the protective bell. This is particularly advantageous if the receiver comprises a self-closing diaphragm or a seal.

Advantageously, the tip is cleaned before introducing the end into the inner cavity, in particular by wiping or rinsing with a cleaning agent comprising in particular isopropanol or ethanol, for example 70% isopropanol.

In one embodiment of the method, the entire sterile protection attachment or just the protective bell is sterilized before introducing the tip. This can be done either immediately before use or by using a sterile-packed exchangeable protective bell or sterile-packed exchangeable sterile protection attachment.

In a preferred embodiment, after the application of sterile air, a final cleaning of the outer surface of the at least one access and/or of the outer surface of the air connection is performed. Here, the cleaning is preferably performed with isopropanol or similar cleaning fluids and/or a disinfectant. The cleaning step makes it easier to work with the multi-connector port even outside of sterile environments and nevertheless ensure filling and withdrawal under sterile conditions. It is preferred here if the multi-connector port comprises at least one cap and this is removed before the cleaning operation and/or is mounted after the final cleaning operation.

In a further embodiment, what are further carried out are the steps of:
   stopping the enveloping when penetrating the self-closing diaphragm of the at least one access by means of the tip, and optionally
   resuming the enveloping once the tip is withdrawn from the vessel or connection.

Advantageously, after the end of penetration of the self-closing diaphragm of the at least one access, the tip is retracted in relation to the protective bell only to such an extent that the end of the tip remains within the cavity of the protective bell.

The sterile protection unit according to the second aspect of the invention, the liquid-handling system according to the third aspect, and the methods according to the fourth, fifth and sixth aspect share the advantages and embodiments of the sterile protection attachment according to the first aspect.

BRIEF DESCRIPTION OF THE DRAWINGS

Further embodiments will be discussed below by way of example on the basis of the accompanying figures, in which.

DETAILED DESCRIPTION OF THE EMBODIMENTS

Figure 1:
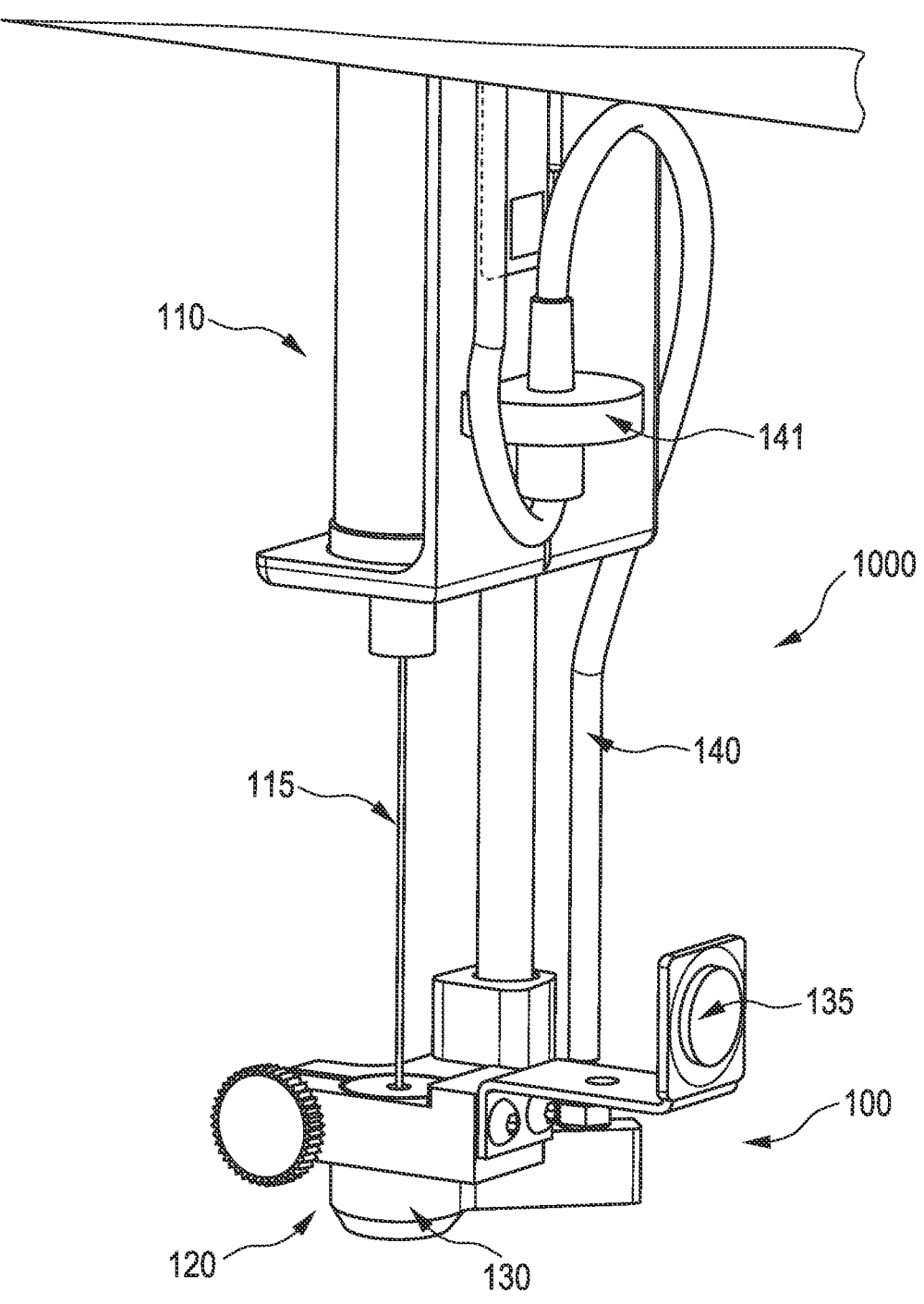
FIG. 1 shows one embodiment of a sterile protection unit according to the second aspect of the invention.

FIG. 1 shows one embodiment of a sterile protection unit 1000 according to the second aspect of the invention, comprising a sterile protection attachment 100 and a tip 115 of a liquid-handling device 110. The tip 115 here is a hollow needle. In the embodiment shown, the sterile protection attachment 100 comprises a mount 120 for fastening the sterile protection attachment 100 to the liquid-handling device 110. A protective bell 130 is arranged therein. In the embodiment shown, the protective bell 130 is arranged and fastened in the mount 120 via a clamping device having an adjusting screw. The protective bell 130 has an inner cavity 133. Connected thereto is a supply line 140 for sterile air. The inner cavity 133 of the protective bell 130 is flooded with sterile air via the supply line 140, thus encapsulating the tip 115 with respect to a nonsterile environment. The protective bell 130 has an opening at a lower end, and a receiver for the tip 115 at an upper side opposite the lower end. Sterile air can escape through the lower opening and is simultaneously replenished via the supply line 140. In the embodiment shown, the protective bell 130 is made of silicone and is thus sufficiently elastic, in particular at its lower end, for it to form a tight seal with a vessel or a connection when mounted thereon. In other embodiments in which the lower end of the protective bell 130 is not configured for a tight seal, the tip 115 is continuously enveloped by sterile air, even while the tip 115 is penetrating into a connection or vessel. This ensures that the tip 115 remains encapsulated with respect to the environment at all times during operation. If the lower end is elastic and is capable of forming a gas-tight seal with the connection or vessel, the supply of sterile air can also be stopped during penetration and can be reactivated only when the tip 115 has been moved out.

Figure 2A:
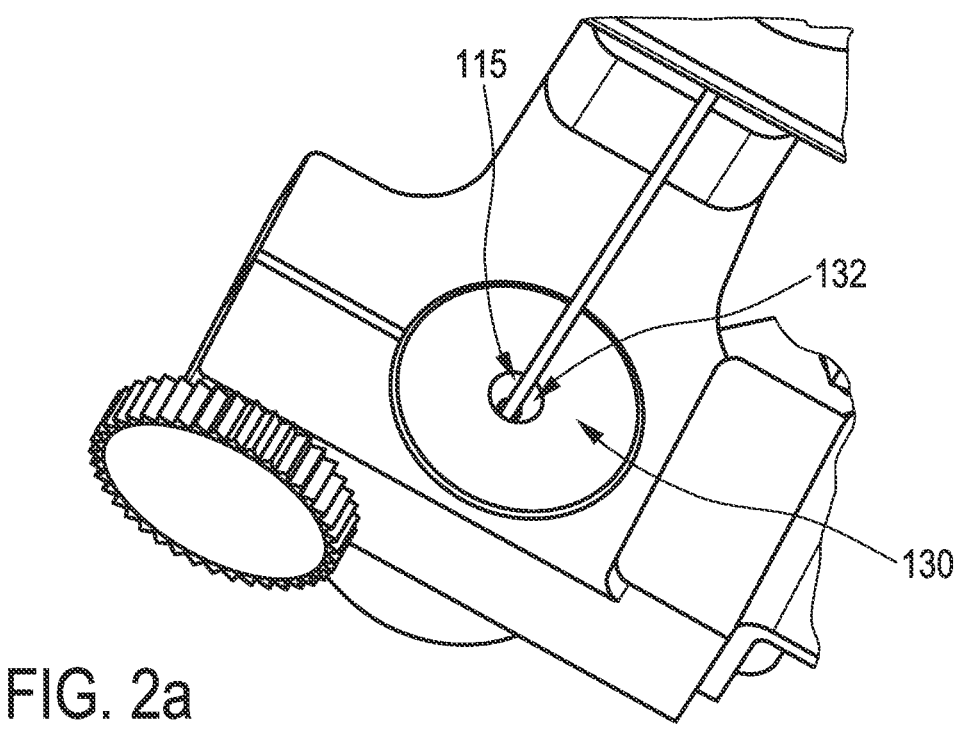
FIGS. 2a and 2b show detailed views of the embodiment of the sterile protection unit from FIG. 1.
Figure 2B:
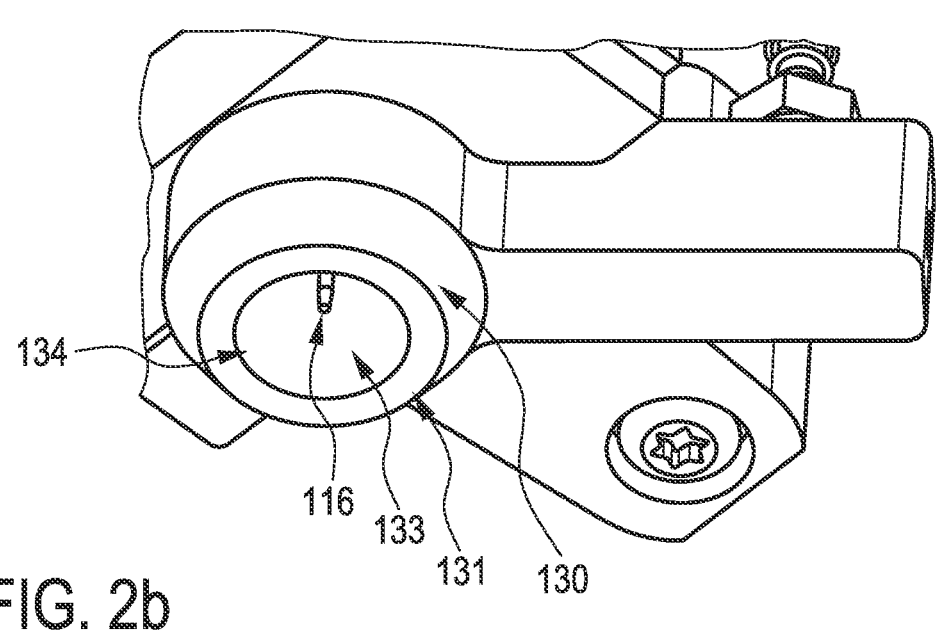

FIGS. 2a and 2b depict detailed views of the sterile protection unit 100. FIG. 2a shows the receiver 132 of the protective bell 130, in which the tip 115 is located. In the embodiment shown, the receiver is an opening through which the tip 115 has been guided. Flushing the inner cavity 133 of the protective bell 130 with sterile air ensures that the tip 115 within the inner cavity 113 is not contaminated. FIG. 2b depicts the lower open end 116 of the tip 115 in the inner cavity 133 of the protective bell 130. Here, the opening 134 at the lower end of the protective bell 130 is circular. The tip 115 is movably arranged relative to the protective bell 130, specifically in such a way that its lower open end 116 is arranged below the protective bell 130 during penetration of a connection or vessel. Thus, the lower open end 116 of the tip 115 can be inserted into a connection or vessel while the portion of the tip 115 in the cavity is still protected from contamination from the ambient air by sterile air from the supply line 140. This allows sterile application and withdrawal into/from a vessel or connection without having to work in a sterile environment.

Figure 3:
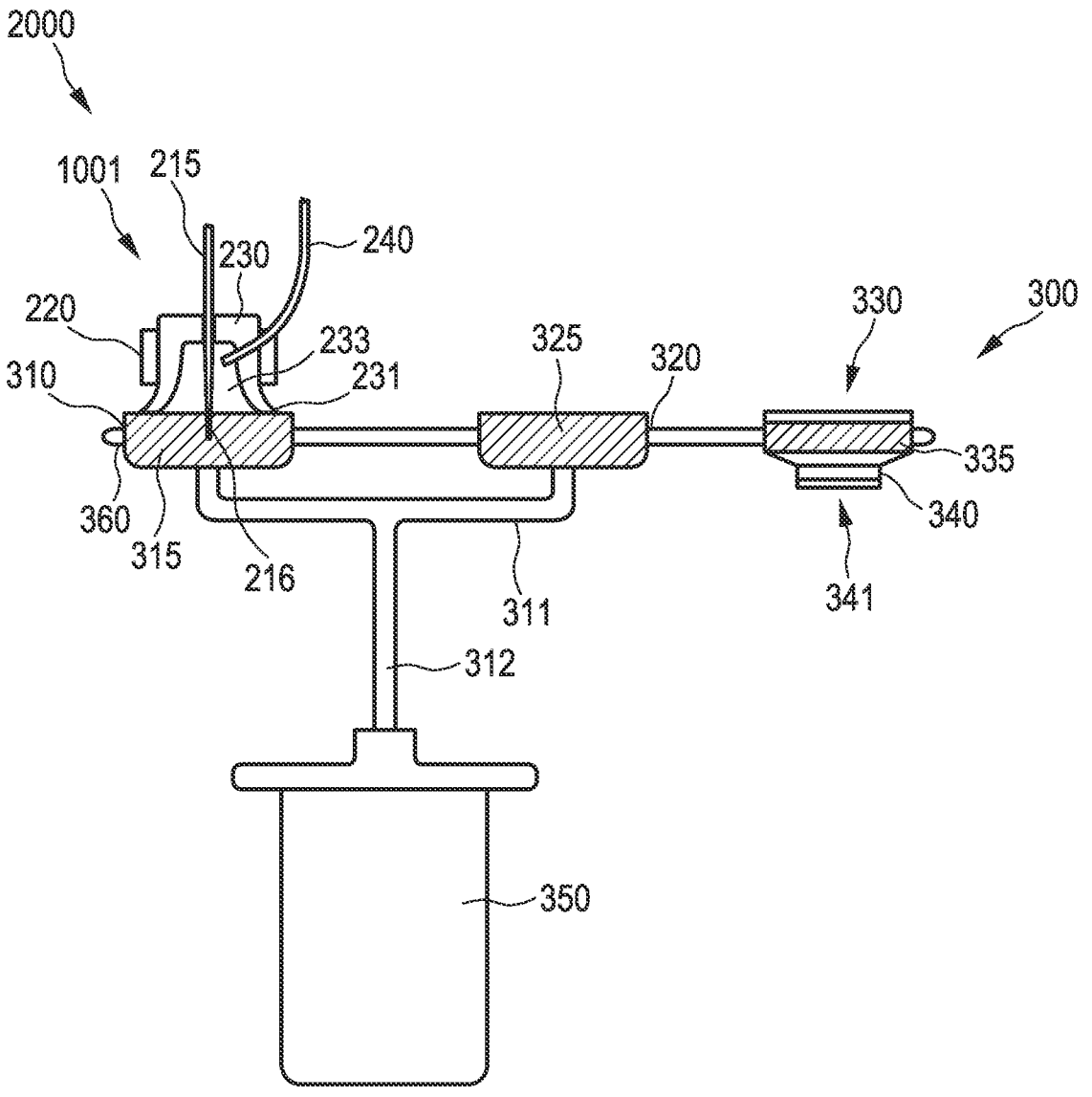
FIG. 3 shows one embodiment of a liquid-handling system according to the third aspect of the invention comprising a multi-connector port.

FIG. 3 shows one embodiment of a liquid-handling system 2000 according to the third aspect of the invention, comprising a sterile protection unit 1001 comprising a tip 215 of a liquid-handling device, having a lower open end 216, and a sterile protection attachment. The sterile protection attachment comprises a mount 220, by means of which the sterile protection attachment is fastened to the liquid-handling device, and a protective bell 230. In the state shown, the protective bell 230 is seated on an access of a multi-connector port 300 of the liquid-handling system 2000. Its lower end 231 is elastic and is bent slightly outward when mounted onto the access, resulting in a gas-tight seal. The inner cavity 233 of the protective bell 230 is flushed with sterile air via a supply line 240 for sterile air, thus encapsulating the tip 215 with respect to the environment. Together with the multi-connector port 300, what is obtained is a flexible liquid-handling system, by means of which sterile work can be carried out even in a nonsterile environment.

The embodiment of the multi-connector port 300 shown here has a connecting piece 311 on which two accesses 310, 320, each having a self-closing diaphragm 315, 325, are arranged. The multi-connector port 300 also has an air connection for sterile air 330, which air connection has a further self-closing diaphragm 335 and a sterile filter 340. Furthermore, the multi-connector port 300 has a fixing device 360 for integration into a handling system. Here, the air connection 330 is not fluidically connected to the connecting piece 311. In the embodiment shown, the sterile filter 340 is in contact with the outside air on its side 341 facing away from the further self-closing diaphragm.

The following explains how the exemplary embodiment of a liquid-handling system 2000 that is shown works. As shown, the lower open end 216 of the tip 215 is introduced into the access 310 and penetrates the self-closing diaphragm 315, which forms a seal around the tip 215 upon penetration. The lower open end 216 is then completely guided through the self-closing diaphragm 315. Now, for example, a medium is applied into the access 310. In the embodiment shown, the flushing with sterile air in the inner cavity 233 can be interrupted or can be carried out continuously. Following the application, the tip 215 is retracted. Its lower open end 216 is then back in the flushed inner cavity 233. Now, the tip 215 can be moved to the air connection 330, said tip 215 also remaining encapsulated with respect to the environment by the sterile air in the inner cavity 233 during the movement.

If the tip 215 is introduced from above through the self-closing diaphragm 330, then air can be drawn in through the sterile filter 340 via said tip 215 and transferred into a reservoir connected to the tip 215. Here too, the tip 215 is encapsulated with respect to the ambient air in the inner cavity 233 by the sterile air and the protective bell 230. Following this, the tip 215 can be reintroduced into one of the accesses 310, 320, in this case access 310, and air can thus be applied into connecting piece 311 and line 312, such that medium situated in the access 310, connecting piece 311, or line 312 from the previous filling or withdrawal process is forced into the reaction vessel 350 that is connected here.

The invention claimed is:

1. A sterile protection attachment for a tip of a liquid-handling device, comprising a mount configured for fastening the sterile protection attachment to the liquid-handling device, a protective bell arranged in the mount and having an inner cavity, and a supply line configured for introducing sterile air to the inner cavity, wherein the protective bell defines an opening at a lower end and the protective bell has a receiver, and wherein the receiver defines an opening through which the tip is configured to be guided, the receiver being disposed at an upper side of the protective bell opposite the lower end.

2. The sterile protection attachment as claimed in claim 1, wherein the receiver is configured to gas- and liquid-tightly enclose the tip.

3. The sterile protection attachment as claimed in claim 1, wherein the protective bell is at least partially constructed of polyetheretherketone.

4. The sterile protection attachment as claimed in claim 1, wherein the mount is designed to be adjustable in length.

5. The sterile protection attachment as claimed in claim 4, wherein the mount is designed to be telescopic.

6. The sterile protection attachment as claimed in claim 1, wherein the supply line for sterile air comprises a sterile filter.

7. The sterile protection attachment as claimed in claim 6, wherein the sterile filter comprises a sterile filter with a pore diameter of less than or equal to 0.22 μm.

8. A sterile protection unit comprising the sterile protection attachment as claimed in claim 1, wherein the tip of the liquid-handling device is arranged in the receiver of the protective bell.

9. The sterile protection unit as claimed in claim 8, wherein the mount is configured such that a lower open end of the tip is continuously arranged within the inner cavity of the protective bell during operation and is arranged below the inner cavity of the protective bell only when the tip penetrates into a vessel or connection.

10. The sterile protection unit as claimed in claim 8, wherein the tip is movably arranged relative to the protective bell during operation.

11. The sterile protection unit as claimed in claim 8, wherein the tip is immovably arranged in relation to the mount and the lower end of the protective bell is elastic.

12. A liquid-handling system comprising at least one liquid-handling device having at least one sterile protection unit as claimed in claim 8.

13. The liquid-handling system as claimed in claim 12, further comprising at least one multi-connector port, wherein the multi-connector port comprises an air connection for sterile air, at least one access arranged on a connecting piece and comprising a self-closing diaphragm, and at least one line arranged on the connecting piece.

14. A method for operating a sterile protection attachment disposed on a tip of a liquid-handling device, the sterile protection attachment comprising a mount configured for fastening the sterile protection attachment to the liquid-handling device, a protective bell arranged in the mount and having an inner cavity, and a supply line configured for introducing sterile air to the inner cavity, wherein the protective bell defines an opening at a lower end and the protective bell has a receiver, and wherein the receiver defines an opening through which the tip is configured to be guided, the receiver being disposed at an upper side of the protective bell opposite the lower end, the method comprising the steps of:

introducing one end of the tip of the liquid-handling device into the inner cavity of the protective bell of the sterile protection attachment, wherein the tip is guided through the receiver of the protective bell; and enveloping the end of the tip with sterile air from the supply line for sterile air.

15. A method for filling or withdrawal using the sterile protection unit as claimed in claim 8, comprising the steps of:

introducing one end of the tip of the liquid-handling device into the inner cavity of the protective bell of the sterile protection attachment, wherein the tip is arranged in the receiver of the protective bell;

enveloping the end of the tip with sterile air from the supply line for sterile air;

cleaning an outer surface of a connection or vessel by wiping or rinsing with a cleaning agent;

penetrating the connection or vessel with the tip;

adding a medium into the connection or vessel or drawing a medium out of the connection or the vessel via the tip; and withdrawing the tip from the connection or vessel.

16. The method as claimed in claim 15, further comprising the step of:

stopping the enveloping when penetrating the connection or vessel via the tip.

17. The method as claimed in claim 16, further comprising the step of:

resuming the enveloping once the tip is withdrawn from the vessel or connection.

18. A method for filling or withdrawal using the liquid-handling system as claimed in claim 13, the method comprising the steps of:

introducing one end of the tip of the liquid-handling device into the inner cavity of the protective bell of the sterile protection attachment;

enveloping the end of the tip with sterile air from the supply line for sterile air;

connecting the at least one line of the multi-connector port to a vessel;

cleaning an outer surface of the at least one access and/or an outer surface of the air connection by wiping or rinsing with a cleaning agent;

penetrating the self-closing diaphragm of the at least one access with the tip;

adding a medium into the vessel or drawing a medium out of the vessel via the tip, withdrawing the tip; and applying sterile air.

19. The method as claimed in claim 18, wherein the tip comprises a hollow needle, a pipette tip or a male connecting piece.

* * * * *